UNITED STATES PATENT OFFICE.

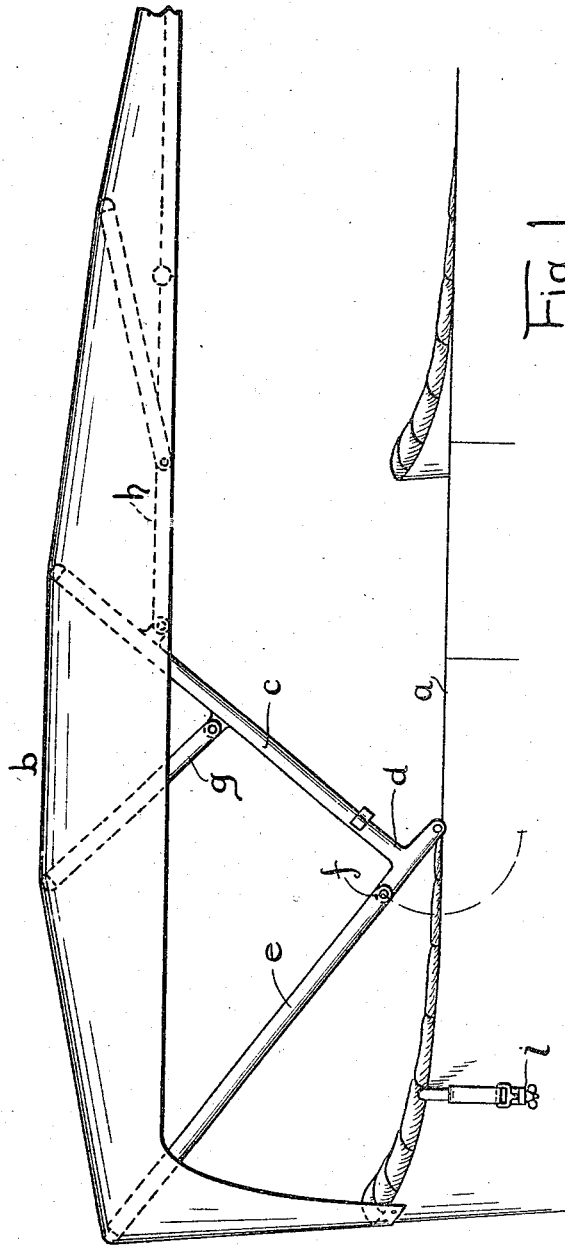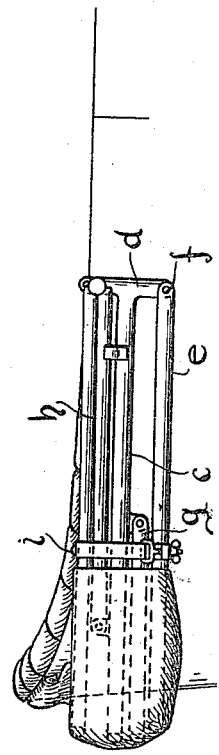

MAX ALVINUS BUCH, OF BIRMINGHAM, ENGLAND, ASSIGNOR TO HENRY E. EDWARDS, OF JACKSON, MICHIGAN.

VEHICLE-TOP.

1,170,604.  Specification of Letters Patent.  Patented Feb. 8, 1916.

Application filed February 19, 1915. Serial No. 9,241.

*To all whom it may concern:*

Be it known that I, MAX ALVINUS BUCH, a subject of the Emperor of Germany, residing at Sparkbrook, Birmingham, county of Warwick, England, have invented a certain new and useful Improvement in Vehicle-Tops, and declare the following to be a full, clear, and exact description of the same, such as will enable others skilled in the art to which it pertains to make and use the same, reference being had to the accompanying drawings, which form a part of this specification.

This invention relates to the so-called one-man tops for vehicles.

It comprises a form of construction which is adapted to hold the top nearer to the body when the top is collapsed so that there is not nearly as great an over-hang of top behind the body as in former structures. This top structure is also so arranged that when collapsed the top is supported below the top of the rear seat so that it in no way interferes with the comfort and the vision of the occupants of the vehicle.

In the drawings,—Figure 1 is a side elevation of the top applied to an automobile body showing the top in position for service. Fig. 2 is a side view of a portion of an automobile body showing my new form of top construction collapsed.

*a* designates the vehicle body, *b* the deck of the top, which is supported in position for service by a bow structure made up of a plurality of bows so arranged that only one bow is pivoted to the body, and the so-called front bows of the common bow structure of the past are eliminated.

My invention resides in using an attachment or an extension of the master bow *c* in such a way that it will draw the rear bow into the body closer than has been heretofore customary, and will also cause the rear bow to rest in a position lower on the body than heretofore has been the custom when the top is collapsed. The other bows are also arranged comparably with the rear bow to occupy closer and lower positions with respect to the body when the bow structure is collapsed.

Instead of pivoting the lower end of the master bow *c* directly to the body, I form a T *d* on the lower end of the master bow. The front end of this T is pivoted to the body. The rear end of this T is pivoted to the rear bow *e*. Heretofore it has been common in one-man top constructions to pivot the rear bow to the body and pivot the master bow to the rear bow. In such a structure the pivot for the rear bows is stationary and hence the rear bows in describing their customary fixed arc must project considerably to the rear of the body when collapsed. With my form of construction the pivot *f* of the rear bows actually moves in and downward with respect to its old position when the bows are collapsed. This movement is indicated by the arc shown in dotted lines in Fig. 1. This movement is due to the pivoting of the master bow *c* at one end of the head of the T and the rear bow *e* at the other end of the head of the T. This form of construction draws the rear bow in and supports the master bow at a lower position on the body as is shown in Fig. 2. This drawing in of the rear bow and supporting it and the master bow lower on the body, of course, likewise draws in the bow *g* and the forward cantaliver construction *h* which is carried upon the master bow. Of course the length of the rear bow, the master bow and the supplemental bows, and the pivotal points of each, must be calculated so that the tops of the bows when collapsed will substantially register. This being merely a matter of proportions and subject to no definite measurements it will be unnecessary to further detail this. Suffice it to say that in the arrangement shown in the drawings this object is substantially accomplished, as shown in Fig. 2.

When the top is collapsed it is held in a prop or rest *i* of any convenient form, there being numerous rests or props which will do the work satisfactorily.

What I claim is:

1. In combination with a vehicle body, a vehicle top having a bow structure in which the central supporting bow has a T terminal, the forward end of the head of the T being pivoted to the body of the vehicle and the rear bow being pivoted to the other end of the head of the T, whereby the bow structure is both drawn in toward the body and occupies a lower position relative to the body when the bows are collapsed.

2. The combination with a vehicle body, of a collapsible top structure provided with a deck and a plurality of folding bows including a master bow pivoted to the vehicle body near the top of the vehicle and arranged to swing down to a substantially horizontal position, the said master bow being provided with an L-shaped terminal, the base of the L extending forwardly of the vehicle when the top is in raised position and the forward end of the base constituting the said pivotal point of the master bow with respect to the top, whereby when the bows are collapsed and assume a substantially horizontal position with respect to the body, the whole bow structure is lowered so that practically the entire bow structure lies below a horizontal line passing through the pivoting of the bow structure to the top.

In testimony whereof, I sign this specification in the presence of two witnesses.

MAX ALVINUS BUCH.

Witnesses:
VIRGINIA C. SPRATT,
R. A. PARKER.

Copies of this patent may be obtained for five cents each, by addressing the "Commissioner of Patents, Washington, D. C."